Figure 1:
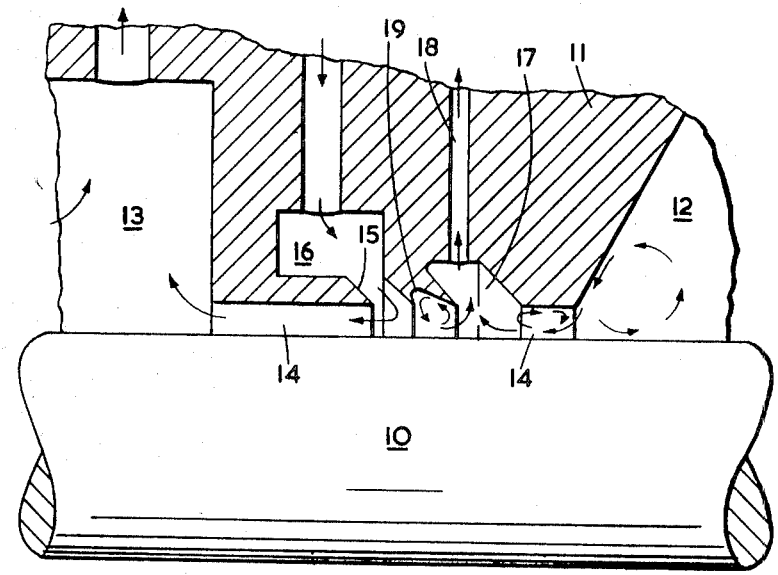

United States Patent
Unsworth et al.

[15] 3,645,544
[45] Feb. 29, 1972

[54] SEAL PRIMARILY FOR A TURBINE

[72] Inventors: Robert George Unsworth; Arnold Bainbridge, both of Rugby, England

[73] Assignee: The English Electric Company Limited, London, England

[22] Filed: Aug. 27, 1969

[21] Appl. No.: 853,292

[30] Foreign Application Priority Data

Aug. 27, 1968 Great Britain.....................40,862/68

[52] U.S. Cl..........................................277/70, 277/DIG. 1
[51] Int. Cl.........................................................F16j 15/44
[58] Field of Search......................277/70, 53, 55, 56, 135 J

[56] References Cited

UNITED STATES PATENTS

| | | |
|---|---|---|
| 1,004,822 | 10/1911 | Scheurmann..........................277/135 |
| 2,448,717 | 9/1948 | Jeffcock...............................277/135 |
| 2,584,513 | 2/1952 | Summers..............................277/135 |

*Primary Examiner*—Samuel B. Rothberg
*Attorney*—Misegades & Douglas

[57] ABSTRACT

A pressure seal is provided as an alternative to the normal gland or labyrinth seal between two relatively rotatable members 10, 11. In this seal an annular jet of seal fluid is directed from a first duct 15 defined in one of the members 10, 11 towards the other member so as to form a moving curtain of seal fluid therebetween, and means 19 is provided for forming an annular mass of seal fluid on the higher pressure side of the moving curtain whereby to prevent entrainment of fluid from the region 12 which adjoins the higher pressure side into the moving curtain and thence into the region 13 adjoining the lower pressure side. A second duct 20 may be defined within the one member 11 for the purpose of forming a further moving curtain of seal fluid between the annular mass and the higher pressure region 12. The second duct 18 may be fed from the same pressure source as the first, suitable throttling means 21 being interposed between the two.

6 Claims, 2 Drawing Figures

Patented Feb. 29, 1972  3,645,544

SEAL PRIMARILY FOR A TURBINE

This invention relates to seals, particularly for turbines and especially steam turbines.

In copending U.S. Pat. application Ser. No. 811,135 of Arnold Bainbridge, filed Dec. 3, 1969, there is described a sealing arrangement for sealing, for example, against the leakage of atmospheric air through a clearance space between the downstream end of a stream turbine shaft and the surrounding casing into the evacuated space leading to a condenser to which is passed steam emerging from the final stage of the steam turbine.

The sealing arrangement described includes a duct formed in the casing and opening into the clearance space, steam at a pressure substantially above atmospheric pressure being directed through the duct towards the turbine shaft so as to form an annular jet which provides a moving curtain of steam across the clearance space and presents a barrier to the leakage of atmospheric air through the clearance space into the evacuated area.

If the duct is arranged so that the annular jet is directed towards the area at atmospheric pressure and if the pressure of the steam directed through the duct is selected so that at least part of the moving curtain of steam turns back upon itself and flows towards the evacuated space, the pressure differential between the area at atmospheric pressure and the evacuated space being supported by the rate of change of momentum of the moving curtain of steam, there is the danger that that part of the moving curtain of steam which flows to the evacuated space may entrain air at atmospheric pressure to flow with it into the evacuated space.

It is an object of the present invention to prevent the entrainment of fluid from the higher pressure side of such a seal into said moving curtain.

According to the invention, a seal for maintaining a pressure difference between two regions on either side of an annular apace defined between two relatively rotatable members, includes a first circumferentially extending duct formed in one of the members and communicating with said space, and first means for feeding a seal fluid to the first duct at a pressure greater than the pressure in either of said two regions, the first duct being arranged to direct an annular jet of said seal fluid into said space with an axial component of velocity directed toward the higher pressure region, at least part of the annular jet being deflected toward the lower pressure region and forming within the space a moving curtain of seal fluid, and the annular jet having sufficient initial velocity that the change of seal fluid momentum occurring during the deflection is sufficient to maintain the pressure difference, and second means for forming and maintaining a circumferentially extending mass of seal fluid within said space and located axially between said moving curtain and the higher pressure region, whereby to present a barrier to the entrainment of fluid from said higher pressure region into said moving curtain.

According to a feature of the invention, said second means includes a circumferentially extending cavity formed in said one member and opening into said space, the cavity being shaped such that a part of said moving curtain is deflected thereinto whereby to form a toroidal vortex which constitutes said circumferentially extending mass of seal fluid.

According to an alternative feature of the invention, said second means includes a second circumferentially extending duct formed in said one member and communicating with said space, the second duct being supplied with seal fluid at a pressure intermediate the supply pressure to said first duct and the pressure in said higher pressure region and being arranged to direct a further annular jet of seal fluid into said space with an axial component of velocity directed toward the lower pressure region, at least part of the further jet being deflected toward the higher pressure region and forming a further moving curtain such that an annular pocket of seal fluid is trapped between the two moving curtains, which pocket constitutes said circumferentially extending mass of seal fluid.

In the latter case said second duct may be supplied with seal fluid from said first means, the required pressure reduction being achieved by interposing suitable throttling means between said first means and said second duct.

The seal may include a third circumferentially extending duct formed in said one member, the further duct having an axial location between the higher pressure region and said circumferentially extending mass of steam, whereby to facilitate removal from the shaft surface of spent seal fluid.

Figure 2:
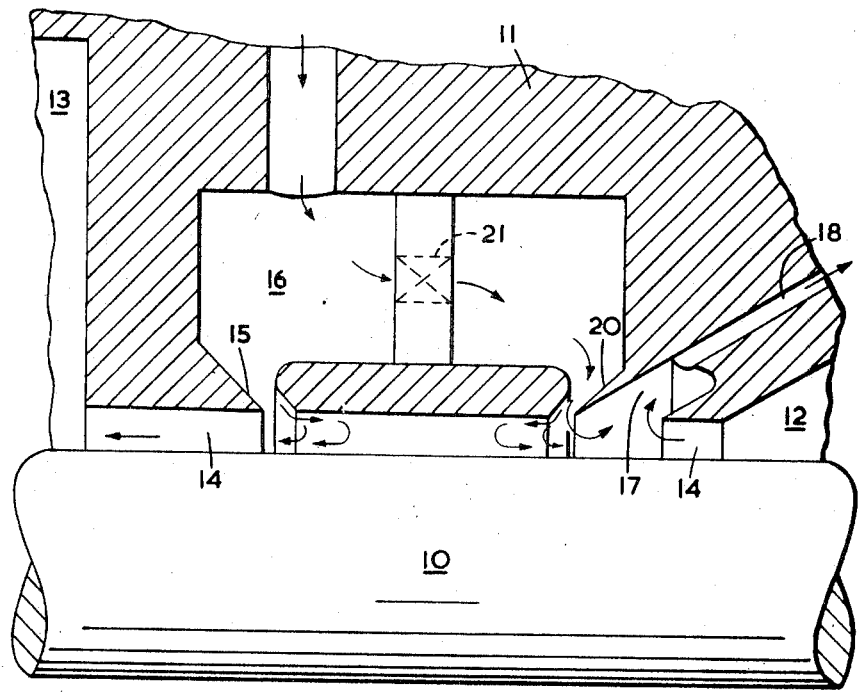

Two embodiments of the invention will now be described, by way of example, with reference to the accompanying drawings, of which:

FIG. 1 is a fragmentary sectional view of a portion of a steam turbine shaft provided with sealing means in accordance with one embodiment of this invention, and FIG. 2 is a fragmentary sectional view of a portion of a steam turbine shaft provided with sealing means in accordance with a second embodiment of this invention.

Referring to FIG. 1, there is illustrated a portion 10 of a steam turbine shaft at the point where it passes through the structure afforded by the steam turbine casing 11, the area 12 to one side of the casing being at atmospheric pressure and the area 13 inside the casing 11 being an evacuated space leading to the condenser of the steam turbine. An annular space 14 is defined between the casing 11 and the shaft portion 10. A duct 15 is formed circumferentially in the casing 11 so as to open into the annular space 14 and is arranged to direct an annular jet into the annular space 14 towards the adjacent surface of the shaft portion 10 with a directional component towards the area 12. The end of the duct 15 within the casing 11 opens into an annular reservoir 16 formed within the casing 11 and communicating with a suitable source of steam under pressure, the actual pressure being dependent upon the dimension of the annular space 14 between the casing 11 and the shaft 10 and the pressure differential between the spaces 12 and 13.

An annular passage 17 is formed circumferentially in the casing 11 so as to open into the annular space 14 at a point spaced axially along the seal from the duct 15 and at the side of the duct 15 adjacent the area 12. The annular passage 17 is substantially parallel to the duct 15. A conduit 18 opens into the passage 17 and leads to an exhauster (not shown).

A specially shaped annular cavity 19 is formed in the surface of the casing 11 which defines the passage 14. The annular cavity 19 lies between the duct 15 and the annular passage 17.

In operation of this embodiment of the invention, an annular jet of steam is ejected from the duct 15 to form a moving curtain of steam which flows across the annular space 14 towards the surface of the shaft portion 10. The pressure of the steam fed to the annular reservoir 16 is selected so that a major part of the moving curtain of steam is deflected by the surface of the shaft portion 10 so as to turn back upon itself and flow towards the area 13. The remainder of the moving curtain of steam is deflected by the surface of the shaft 10 into the cavity 19 which is specially shaped so as to establish a stable interspace vortex. Steam emerging from the vortex enters the annular passage 17, mixes with atmospheric air and flows through the annular passage 17 with a directional component towards the area 13. The air and steam mixture is removed from the annular passage 17 through the conduit 18 by the exhauster.

The difference in pressure between the areas 12 and 13 is supported by the rate of change of momentum of those parts of the moving curtain of steam which flow towards the area 13 on the one hand and into and through the annular passage 17 on the other hand. The stable interspace vortex generated within the annular space 14 by the annular cavity 19 presents an annular mass of steam which provides a barrier to the entrainment of atmospheric air into the area 13 by that part of the moving curtain of steam which flows to the area 13. Air which enters that part of the annular space 14 on the side of the passage 17 adjacent the area 12 is entrained into the annular passage 17 by the steam which flows through that passage. Thus it will be seen that the moving curtain of steam directed through the annular duct 15 presents a barrier to the passage of atmospheric air into the space 13 through the annular passage 14.

Referring to FIG. 2 in which like parts have been allocated the same reference numerals as in the embodiment illustrated in FIG. 1, the annular passage 17 of this embodiment slopes in a different direction to that of the first embodiment so that the flow path through it has a directional component towards the space 12. Furthermore in this embodiment the annular cavity 19 is replaced by another annular duct 20 which opens into the annular space 14 between the annular passage 17 and the annular duct 15. The annular duct 20 is fed with steam from the reservoir 16 through a throttle 21 so that the pressure of the steam fed to the annular duct 20 is less than the pressure of the steam fed to the annular duct 15 while being above atmospheric pressure, and the duct 20 is arranged so as to direct a moving curtain of steam towards the adjacent portion of the shaft 10 with a directional component towards the space 13.

In operation of this embodiment of the invention an annular jet of steam is ejected from the duct 15 towards the shaft 10 so as to form a moving curtain of steam which flows across the annular space 14 and is deflected by the surface of the shaft 10 towards the area 13. Likewise an annular jet of steam is ejected from the duct 20 so as to form the moving curtain of steam which flows across the annular space 14 and is deflected by the surface of the shaft portion 10 into the annular passage 17, thus entraining into the annular passage 17 any atmospheric air which enters that part of the annular space 14 on the side of the passage 17 adjacent the area 12. The two moving curtains of steam form and maintain an annular buffer pocket of steam between them which affords an annular mass of steam. The annular mass of steam provides a barrier to the entrainment of atmospheric air into the space 13 by the moving curtain of steam issuing from the annular duct 15.

Ideally the pressure of steam supplied to the reservoir 16 is selected so that the rate of change of momentum of the moving curtain issuing from the annular duct 15 just balances the pressure difference between the spaces 12 and 13.

In practice, however, such a balance is difficult to maintain and it is therefore advisable to supply the steam at a pressure rather above the minimum necessary to maintain the required pressure difference. The surplus steam forms a reserve against fluctuations in the steam supply pressure and in the pressure conditions adjoining the seal which may occur during normal running of the turbine.

The throttle 21 is arranged so that the pressure of the annular jet directed from the annular duct 20 is such that the pressure of the steam in the buffer pocket between the two moving curtains of steam is only just above atmospheric pressure, thereby only marginally increasing the pressure difference which must be supported by the moving curtain of steam issuing from the annular duct 15.

We claim:

1. A seal for maintaining a pressure difference between two regions one on each side of an annular clearance defined between two relatively rotatable members, the seal including:

nozzle means associated with one member;

fluid feeding means connected to the nozzle means for feeding fluid thereto a seal fluid at a pressure greater than the pressure in either of said two regions, the nozzle means being arranged to direct an annular jet of said seal fluid into the clearance with a component of velocity directed towards the higher pressure region such that at least part of the annular jet is deflected towards the lower pressure region by the said pressure difference;

an annular chamber between the said nozzle means and the said higher pressure region, and communicating with the nozzle means through the said clearance;

outlet means for the annular chamber, said outlet means being separate from the said lower and higher pressure regions;

vacuum means connected to the outlet means for extracting seal fluid from the annular chamber; and barrier means between the said nozzle means and the said annular chamber for forming and maintaining within the clearance an annular mass of seal fluid which is effectively axially stationary between said annular jet and the said annular chamber.

2. A seal according to claim 1, wherein the said barrier means includes a circumferentially extending cavity defined by said one member and opening into the clearance, the cavity being shaped to receive part of said annular jet and to form therefrom a toroidal vortex which constitutes said annular mass of seal fluid.

3. A seal according to claim 1, wherein said barrier means includes a further nozzle means associated with said one member and opening into the clearance and arranged to direct a further annular jet of seal fluid into the clearance at a point between the said annular jet and the said annular chamber such that an annular mass of seal fluid is trapped between the said annular jet and the further annular jet.

4. A seal according to claim 3, wherein the further nozzle means is connected to the said feeding means via pressure reducing throttling means.

5. A seal according to claim 1, wherein said one member is a stationary structure and the other member is a shaft.

6. Steam turbine plant having at least one seal according to claim 1.

* * * * *